(12) United States Patent
Harada et al.

(10) Patent No.: US 12,273,922 B2
(45) Date of Patent: Apr. 8, 2025

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 318 days.

(21) Appl. No.: 16/089,050

(22) PCT Filed: Mar. 31, 2017

(86) PCT No.: PCT/JP2017/013651
§ 371 (c)(1),
(2) Date: Sep. 27, 2018

(87) PCT Pub. No.: WO2017/171026
PCT Pub. Date: Oct. 5, 2017

(65) Prior Publication Data
US 2020/0305199 A1    Sep. 24, 2020

(30) Foreign Application Priority Data
Mar. 31, 2016    (JP) .................. 2016-073409

(51) Int. Cl.
*H04W 74/0833* (2024.01)
*H04W 74/08* (2009.01)

(52) U.S. Cl.
CPC ... *H04W 74/0833* (2013.01); *H04W 74/0875* (2013.01)

(58) Field of Classification Search
None
See application file for complete search history.

(56) References Cited

U.S. PATENT DOCUMENTS 9,516,640 B2 * 12/2016 Pazhyannur ........ H04W 72/042
2015/0358827 A1    12/2015 Bendlin et al.
(Continued)

FOREIGN PATENT DOCUMENTS

CN    105451358 A    3/2016
EP    3429303 A1    1/2019
(Continued)

OTHER PUBLICATIONS

Huawei, "Other Issues Related to LBT for eLAA", document No. R1-160741 (Year: 2016).*
(Continued)

*Primary Examiner* — Jamaal Henson
(74) *Attorney, Agent, or Firm* — Osha Bergman Watanabe & Burton LLP

(57) ABSTRACT

To actualize proper UL communication in a communication system using a cell where application of listening is defined, a user terminal has a reception section that receives a DL signal including a UL transmission indication, and a control section that controls transmission of UL data based on the UL transmission indication and a channel access procedure before UL transmission, where the control section controls so as to perform a channel access procedure with random back-off.

6 Claims, 16 Drawing Sheets

| UL Cat.4 LBT Priority class (p) | $m_p$ | $CW_{min,p}$ | $CW_{max,p}$ | $T_{mcot,p}$ | Allowed $CW_p$ sizes |
|---|---|---|---|---|---|
| 1 | 1 | 1 | 3 | 1ms | {1,3} |
| 2 | 1 | 3 | 4 | 2ms | {3,4} |
| 3 | 3 | 4 | 6 | 8 or 10ms | {4,5,6} |
| 4 | 3 | 4 | 7 | 8 or 10ms | {4,5,6,7} |

(56) References Cited

U.S. PATENT DOCUMENTS

| | | | | |
|---|---|---|---|---|
| 2016/0007350 | A1* | 1/2016 | Xiong | H04W 24/10 |
| | | | | 370/252 |
| 2016/0212649 | A1* | 7/2016 | Chen | H04L 1/1896 |
| 2016/0302230 | A1* | 10/2016 | Novlan | H04L 27/0006 |
| 2016/0338053 | A1* | 11/2016 | Park | H04W 74/0808 |
| 2016/0345206 | A1* | 11/2016 | Yerramalli | H04L 5/0053 |
| 2017/0222776 | A1* | 8/2017 | Dinan | H04L 1/0004 |
| 2017/0230968 | A1* | 8/2017 | Yu | H04W 74/0808 |
| 2017/0231004 | A1* | 8/2017 | Babaei | H04W 74/0808 |
| 2017/0238342 | A1* | 8/2017 | Yang | H04W 72/543 |
| | | | | 370/329 |
| 2017/0280475 | A1* | 9/2017 | Yerramalli | H04W 72/56 |
| 2017/0289869 | A1* | 10/2017 | Nogami | H04L 5/0094 |
| 2017/0321004 | A1* | 11/2017 | Fernandez | C08G 64/42 |
| 2018/0054792 | A1* | 2/2018 | Lee | H04B 17/24 |
| 2018/0124749 | A1* | 5/2018 | Park | H04W 74/08 |
| 2018/0175975 | A1* | 6/2018 | Um | H04L 1/18 |
| 2018/0270860 | A1* | 9/2018 | Bhorkar | H04W 74/006 |
| 2018/0279367 | A1* | 9/2018 | Han | H04W 74/0808 |
| 2018/0279386 | A1* | 9/2018 | Liu | H04W 74/0875 |
| 2018/0288805 | A1* | 10/2018 | Bhorkar | H04W 74/0816 |
| 2018/0332576 | A1* | 11/2018 | Oh | H04W 74/08 |
| 2018/0352575 | A1* | 12/2018 | You | H04W 72/23 |
| 2019/0037580 | A1* | 1/2019 | Oh | H04W 72/12 |
| 2019/0090230 | A1* | 3/2019 | Mukherjee | H04W 74/004 |
| 2019/0098658 | A1* | 3/2019 | Noh | H04W 74/0833 |
| 2019/0150170 | A1* | 5/2019 | Park | H04W 74/08 |
| | | | | 370/329 |
| 2020/0305199 | A1* | 9/2020 | Harada | H04W 74/08 |
| 2021/0195639 | A1* | 6/2021 | Kim | H04W 16/14 |

FOREIGN PATENT DOCUMENTS

| | | |
|---|---|---|
| WO | 2017/074638 A1 | 5/2017 |
| WO | WO-2017099860 A1 * | 6/2017 |

OTHER PUBLICATIONS

Huawei, "Other Issues Related to LBT for eLAA", document No. R1-160741, submitted as prior art by the applicant on Mar. 28, 2022 (Year: 2022).*

Huawei, "Other Issues Related to LBT for eLAA", document No. R1-160741, submitted as prior art by the applicant on Mar. 28, 2022 (Year: 2016).*

Office Action issued in corresponding European Application No. 17775557.6, mailed Aug. 6, 2020 (8 pages).

Office Action issued in corresponding Japanese Application No. 2016-073409, mailed May 9, 2017 (9 pages).

Office Action issued in corresponding Japanese Application No. 2016-073409, mailed Jul. 25, 2017 (9 pages).

Extended European Search Report issued in corresponding European Application No. 17775557.6, mailed Jan. 30, 2019 (15 pages).

Alcatel-Lucent Shanghai Bell, et al.; "Remaining Details of Single-Carrier LBT"; 3GPP TSG RAN WG1 Meeting #83, R1-157013; Anaheim, USA; Nov. 15-22, 2015 (6 pages).

Ericsson; "On Forward Compatibility of DL-only LAA Design"; 3GPP TSG RAN WG1 Meeting #82bis R1-156044; Malmo, Sweden, Oct. 5-9, 2015 (2 pages).

LG Electronics; "LBT schemes in LAA UL"; 3GPP TSG RAN WG1 meeting #84 R1-160630; St Julian's, Malta, Feb. 15-19, 2016 (10 pages).

Lenovo; "LBT mechanism for LAA uplink"; 3GPP TSG RAN WG1 Meeting #84 R1-161013; St Julian's, Malta, Feb. 15-19, 2016 (4 pages).

InterDigital Communications; "On UL data transmission for eLAA"; 3GPP TSG-RAN WG1 Meeting #84 R1-161079; St Julian's, Malta, Feb. 15-19, 2016 (3 pages).

InterDigital Communications; "UL channel access for eLAA"; 3GPP TSG-RAN WG1 Meeting #84 R1-161084; St Julian's, Malta, Feb. 15-19, 2016 (3 pages).

AT&T; "Drivers, Benefits and Challenges for LTE in Unlicensed Spectrum"; 3GPP TSG-RAN Meeting #62 RP-131701; Busan, Korea, Dec. 3-6, 2013 (3 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Netword (E-UTRAN); Overall description; Stage 2 (Release 12)"; Dec. 2014 (251 pages).

International Search Report issued in PCT/JP2017/013651 mailed on May 16, 2017 (2 pages).

Written Opinion of the International Searching Authority issued in PCT/JP2017/013651 mailed on May 16, 2017 (4 pages).

Office Action issued in Chinese Application No. 201780021190.7 mailed on Jun. 15, 2022 (15 pages).

3GPP TSG RAN WG1 84 Meeting; R1-160741 "Other issues related to LBT for eLAA" Huawei, HiSilicon; St Julian's, Malta; Feb. 15-19, 2016 (5 pages).

Office Action issued in Chinese Application No. 201780021190.7; Dated Dec. 30, 2021 (16 pages).

Office Action issued in corresponding Chinese Application No. 201780021190.7, mailed Nov. 10, 2022 (14 pages).

Office Action issued in corresponding European Application No. 17775557.6, mailed Jul. 29, 2021 (8 pages).

* cited by examiner

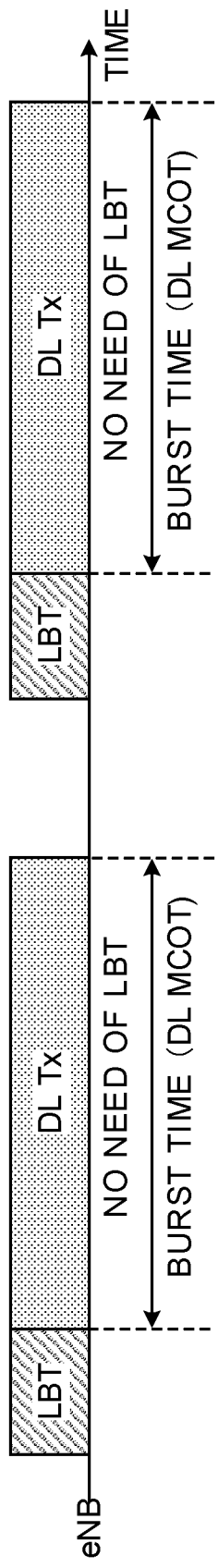
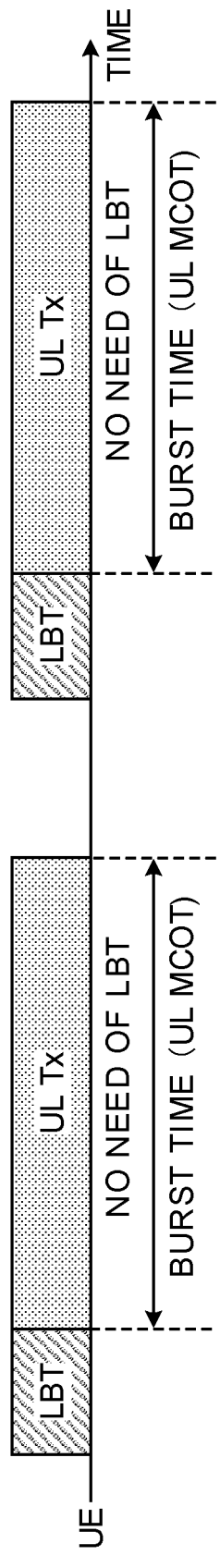
FIG. 1A
FIG. 1B

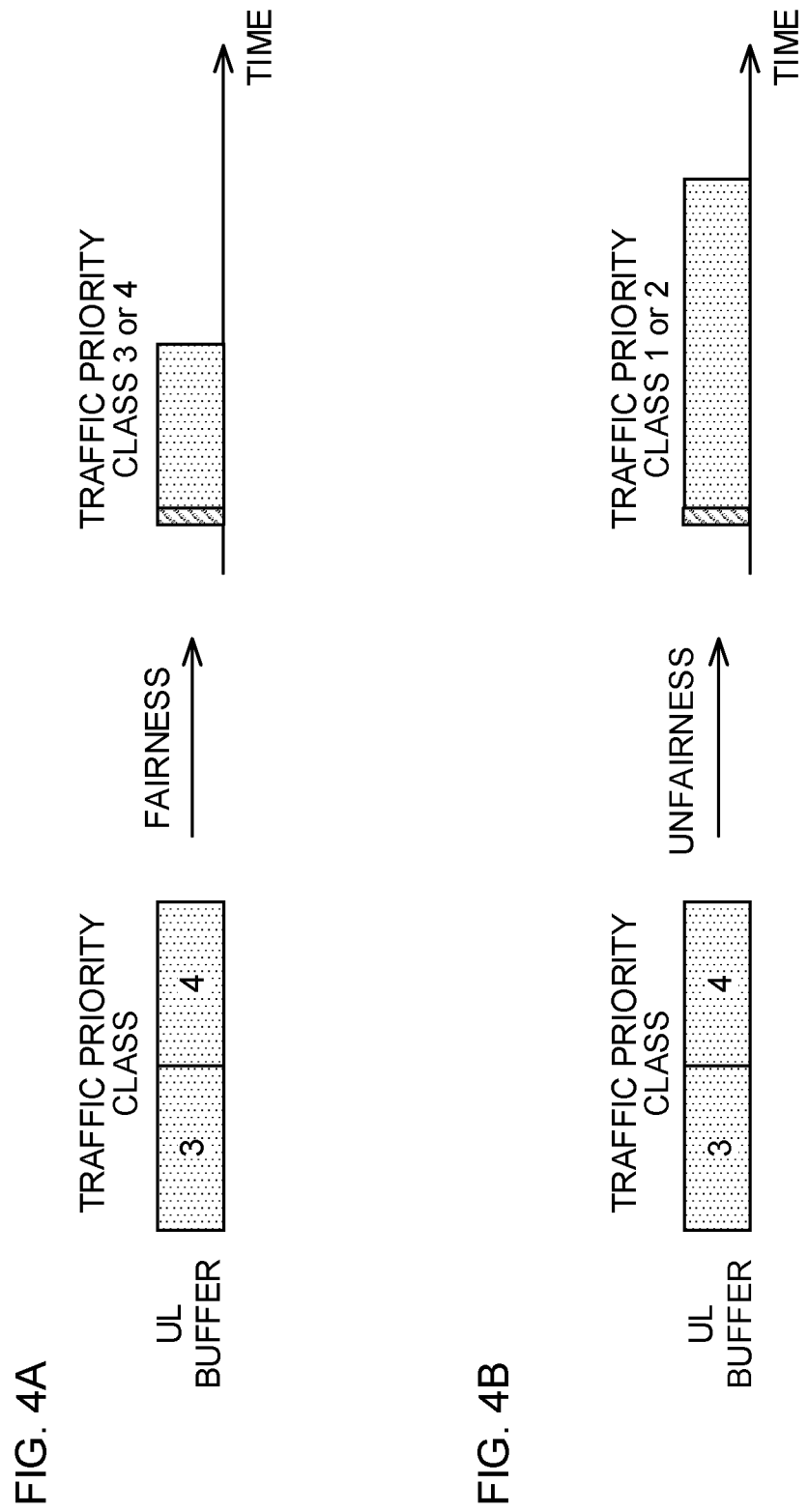

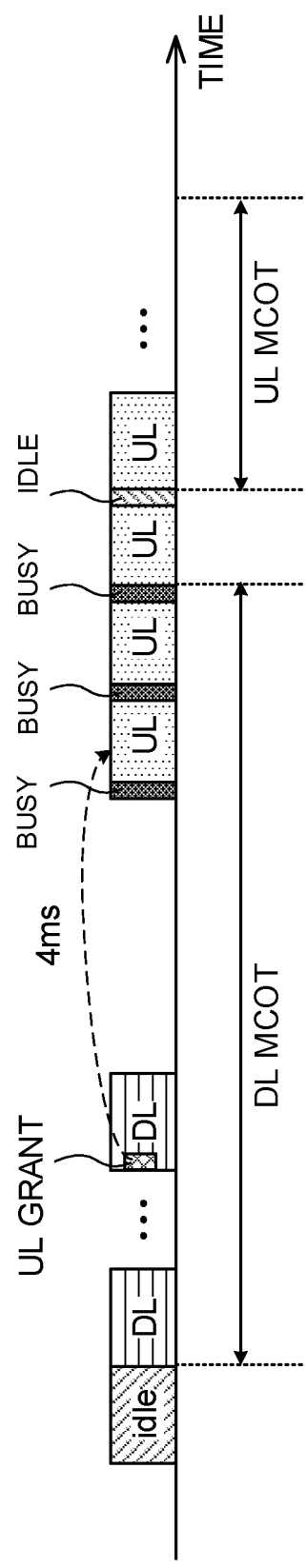
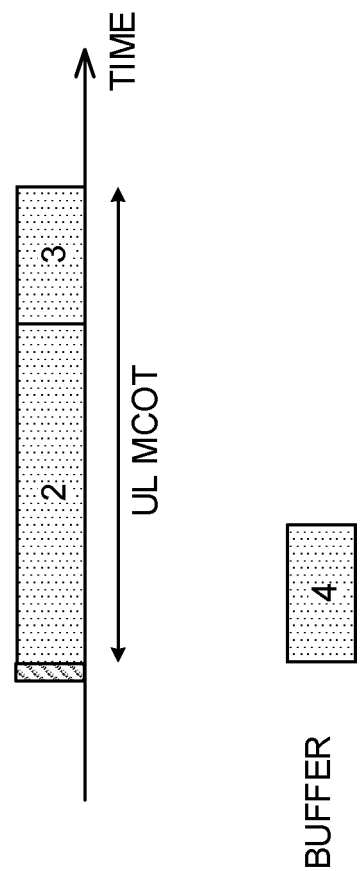
FIG. 5A
FIG. 5B

| UL Cat.4 LBT Priority class (p) | $m_p$ | $CW_{min,p}$ | $CW_{max,p}$ | $T_{mcot,p}$ | Allowed $CW_p$ sizes |
|---|---|---|---|---|---|
| 1 | 1 | 1 | 3 | 1ms | {1,3} |
| 2 | 1 | 3 | 4 | 2ms | {3,4} |
| 3 | 3 | 4 | 6 | 8 or 10ms | {4,5,6} |
| 4 | 3 | 4 | 7 | 8 or 10ms | {4,5,6,7} |

FIG. 6

| Information | UL grant | Common PDCCH |
|---|---|---|
| LBT type: Cat.2 or Cat.4 | 1 bit | - |
| Cat. 4 UL LBT, CWS | - | 2bits or Xbits |
| Channel access priority class and/or MCOT | 2bits or Xbits | - |
| Presence of UL LBT gap | 1bit | - |
| Length of UL LBT gap | 2bits | - |
| ED threshold | - | 1bit |

| Presence of UL LBT gap field | |
|---|---|
| Value | Description |
| 0 | Presence |
| 1 | Absence |

FIG. 10B

| Length of UL LBT gap field | |
|---|---|
| Value | Description |
| 00 | 1symbol |
| 01 | 2symbol |
| 10 | 3symbol |
| 11 | Reserved |

FIG. 10C

| Length of UL LBT gap field | |
|---|---|
| Value | Description |
| 00 | 0symbol (Absence) |
| 01 | 1symbol |
| 10 | 2symbol |
| 11 | 3symbol |

USER TERMINAL, RADIO BASE STATION AND RADIO COMMUNICATION METHOD

TECHNICAL FIELD

The present invention relates to a user terminal, radio base station and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, LTE-Advanced (Rel.10-12) has been specified, and furthermore, for example, a successor system called 5G (5th Generation mobile communication system) to LTE has been studied.

In LTE of Rel.8-12, standardization has been carried out on the assumption that exclusive operation is performed in a frequency band (also referred to as a licensed band) licensed to a network operator. As the licensed band, for example, 800 MHz, 1.7 GHz, 2 GHz and the like are used.

In recent years, popularization of more sophisticated user terminals (UE: User Equipment) such as smartphones and tablets has sharply increased user traffic. In order to accommodate increased user traffic, it is required to further add frequency bands, but the spectrum (licensed spectrum) of the licensed band is limited.

Therefore, in Rel.13 LTE, it is studied to expand frequencies of the LTE system, using a band (also referred to as an unlicensed band) of an available unlicensed spectrum other than the licensed band (Non-patent Document 2). As the unlicensed band, for example, use of 2.4 GHz band, 5 GHz band and the like capable of using Wi-Fi (Registered Trademark) and Bluetooth (Registered Trademark) is studied.

Specifically, in Rel.13 LTE, it is studied to perform Carrier Aggregation (CA) between a licensed band and an unlicensed band. Communication performed by thus using an unlicensed band together with a licensed band is referred to as LAA (License-Assisted Access). In addition, in the future, there is a possibility that Dual Connectivity (DC) of a licensed band and an unlicensed band and Stand-Alone (SA) of an unlicensed band are also study targets for LAA.

PRIOR ART DOCUMENT

Non-Patent Document

[Non-patent Document 1] 3GPP TS 36.300 "Evolved Universal Terrestrial Radio Access (E-UTRA) and Evolved Universal Terrestrial Radio Access Network (E-UTRAN); Overall description; Stage 2"
[Non-patent Document 2] AT&T, Drivers, Benefits and Challenges for LTE in Unlicensed Spectrum, 3GPP TSG-RAN Meeting #62 RP-131701

DISCLOSURE OF INVENTION

Problems to be Solved by the Invention

In an unlicensed band, for coexistence with LTE of another operator, Wi-Fi or another system, introduction of interference control function is studied. In Wi-Fi, as the interference control function within the same frequency, LBT (Listen Before Talk) based on CCA (Clear Channel Assessment) is used.

Accordingly, also in the case of setting an unlicensed band on the LTE system, it is considered that each of UL transmission and DL transmission is controlled, by applying listening (e.g., LBT) as the interference control function. In such a case, it is demanded to gain efficient and fair coexistence with another system and another operator.

In the case of controlling transmission by applying listening, the presence or absence of transmission and/or transmission timing is changed based on a listening result performed before transmission. For example, in the case where a user terminal transmits a UL signal in an unlicensed band, based on an uplink transmission indication (e.g., UL grant) received from a radio base station, each of the radio base station and the user terminal performs listening before transmission.

The DL standard to perform listening before signal transmission in the radio base station has already been discussed, but a UL standard to perform listening before signal transmission in a user terminal is under circumstances where the standard has yet not been discussed in detail. Therefore, it is necessary to study the UL standard for listening.

In this case, it is important to gain fair coexistence with another system and another operator, and it is also necessary to define the UL standard in consideration of actualization of appropriate UL communication. For example, though a radio base station performs listening before transmitting a DL signal (UL grant) to provide indications for a UL signal to be transmitted, when UL data transmission in response to the UL grant is affected by a UL listening result, UL transmission is not performed, unless listening of both DL and UL succeeds, and there is a possibility of the occurrence that a UL signal is not transmitted for a long period. Further, when listening significantly limits transmission of signals important for communication of uplink control information including a receipt confirmation signal (HARQ-ACK) used in retransmission control of DL and the like, there is the risk that communication is properly not performed. Accordingly, in order to study the UL standard for listening, it is important that it is possible to actualize proper UL communication.

The present invention was made in view of such a respect, and it is an object of the invention to provide a user terminal, radio base station and radio communication method capable of actualizing proper UL communication, in a communication system using a cell where application of listening is defined.

Means for Solving the Problem

One aspect of a user terminal of the present invention is characterized by having a reception section that receives a DL signal including a UL transmission indication, and a control section that controls transmission of UL data based on the UL transmission indication and a channel access procedure before UL transmission, where the control section controls so as to perform a channel access procedure with random back-off.

Advantageous Effect of the Invention

According to the present invention, it is possible to actualize proper UL communication, in the communication system using the cell where application of listening is defined.

BRIEF DESCRIPTION OF DRAWINGS

FIGS. 1A and 1B are diagrams showing one example of a communication method using listening (channel access procedure);

FIGS. 4A and 4B are diagrams to explain Aspect 1 (Condition 1) of this Embodiment;

FIGS. 5A and 5B are diagrams to explain Aspect 1 (Condition 1) of this Embodiment;

FIG. 6 is a diagram to explain Aspect 2 (Condition 2) of this Embodiment;

FIG. 9 is a diagram to explain a method of notifying of information about UL LBT of this Embodiment;

FIGS. 10A to 10C are diagrams to explain the method of notifying of information about UL LBT of this Embodiment;

BEST MODE FOR CARRYING OUT THE INVENTION

Figure 2:
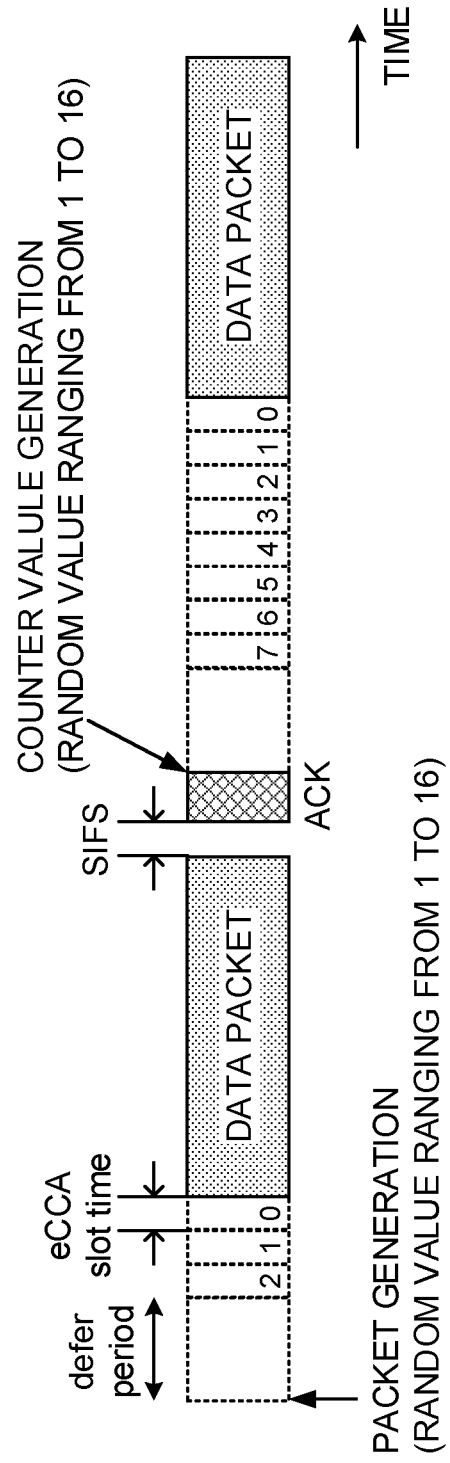
FIG. 2 is a diagram showing an application example of random back-off.

In a system (e.g., LAA system) to operate LTE/LTE-A in an unlicensed band, it is considered that the interference control function is necessary for coexistence with LTE of another operator, Wi-Fi or another system. In such a case, it is demanded to gain efficient and fair coexistence with another operator and another system. In addition, irrespective of whether an operation form is CA, DC or SA, the system to operate LTE/LTE-A in an unlicensed band may be collectively cal led LAA, LAA-LTE, LTE-U, U-LTE and the like.

Generally, in a transmission point (e.g., radio base station (eNB), user terminal (UE) and the like) that performs communication using a carrier (also called a carrier frequency or simply frequency) in an unlicensed band, in the case of detecting another entity (e.g., another user terminal) that performs communication with a carrier in the unlicensed band, the transmission point is prohibited from performing transmission with the carrier.

Therefore, the transmission point executes listening (LBT: Listen Before Talk) at timing before transmission timing by a predetermined period. Specifically, the transmission point to execute LBT searches the entire targeted carrier band (e.g., one component carrier (CC: Component Carrier)) at timing before transmission timing by a predetermined period, and ascertains whether or not another apparatus (e.g., radio base station, user terminal, Wi-Fi apparatus and the like) performs communication in the carrier band.

The listening refers to operation for some transmission point (e.g., radio base station, user terminal and the like) to detect/measure whether or not a signal exceeding a predetermined level (e.g., predetermined power) is transmitted from another transmission point or the like to determine whether the channel is free or busy, before transmitting a signal. Further, listening performed by the radio base station and/or user terminal may be called a channel access procedure, LBT, CCA (Clear Channel Assessment), carrier sense and the like.

When the transmission point is capable of ascertaining that another apparatus does not perform communication, the transmission point performs transmission using the carrier. For example, when received power (received signal power during LBT time) measured in LBT is a predetermined threshold or less, the transmission point determines that the channel is in an idle state (LBT idle) to perform transmission. In other words, "the channel is in an idle state" refers to that the channel is not occupied by a particular system, and also refers to that the channel is idle, the channel is clear, the channel is free and the like.

On the other hand, in the targeted carrier band, in the case of detecting that even a part of the band is under use by another apparatus, the transmission point halts the transmission processing thereof. For example, in the case of detecting that received power of a signal from another apparatus according to the band exceeds a predetermined threshold, the transmission point determines that the channel is in a busy state ($LBT_{busy}$) and does not perform transmission. In the case of $LBT_{busy}$, after performing LBT again and ascertaining that the channel is in an idle state, the channel is first available. In addition, the method of determining whether the channel is in an idle state or busy state by LBT is not limited thereto.

FIG. 1 shows one example of a communication method using listening (channel access procedure). FIG. 1A illustrates DL transmission, and FIG. 1B illustrates UL transmission.

In the case of DL transmission, when a result of listening (DL-LBT) performed before DL transmission by the radio base station is LBT-idle, it is possible to set a time for permitting DL transmission (DL burst transmission) with LBT omitted (FIG. 1A). The time for permitting transmission successively without performing LBT after listening (in the case of LBT-idle) is also called DL Maximum Channel Occupancy Time (DL MCOT), channel occupancy time, and burst time (burst transmission time, burst length, maximum burst length, maximum allowable burst length, Maximum burst length).

In the case of UL transmission, when a result of listening (UL-LBT) performed before UL data transmission by the user terminal is LBT-idle, it is possible to set a time for permitting UL data transmission (DL burst transmission) with LBT omitted (FIG. 1B). The time for permitting transmission successively without performing LBT after listening (in the case of LBT-idle) is also called UL Maximum Channel Occupancy Time (UL MCOT), channel occupancy time, and burst time (burst transmission time, burst length, maximum burst length, maximum allowable burst length, Maximum burst length).

As described above, in the LAA system, by introducing interference control based on the LBT mechanism, it is possible to avoid interference between LAA and Wi-Fi, interference between LAA systems, and the like. Further, also in the case of performing control of transmission point independently for each operator that operates the LAA system, it is possible to reduce interference, without grasping each control detail by LBT.

On the other hand, in the case of introducing the LBT mechanism in the LAA system, it is demanded to gain fair coexistence with another system (e.g., Wi-Fi) and another LTE operator.

In order to actualize fair coexistence with another system and another operator, also in the case of using the LTE/LTE-A system in an unlicensed band, it is considered that random back-off is applied in listening. The random back-off refers to the mechanism of waiting a randomly set time (counter value) for transmission and starting transmission when a channel is clear, without each transmission point starting transmission soon even when the channel is in an available state (idle state).

For example, in the case where the channel is in a used state (busy state) in an unlicensed band, when each transmission point (access point) determines that the channel is in an available state (idle state) by listening, the transmission point starts transmission of data. At this point, when a plurality of transmission points, which waits for an available state of the channel, simultaneously starts transmission, the possibility increases that transmission points collide with one another. Therefore, in order to suppress the collision between transmission points, even when the channel is in an available state, each transmission point does not start transmission soon, and waits a randomly set time for transmission to suppress the probability of the collision between transmission points (random back-off). The LBT mechanism with the random back-off is referred to as Category 4. On the other hand, the LBT mechanism without the random back-off is referred to as Category 2 (LBT mechanism of permitting transmission immediately after a predetermined time (also called defer duration (D_eCCA)).

The back-off time set on each transmission point is capable of being determined based on a counter value (random number value) set randomly. A range of the counter value is determined based on a contention window (CW) size, and for example, the counter value of random back-off is set randomly in a range of 0 to CW size (integer value).

The CW size is set between a maximum value CWmax,p of CW and a minimum value CWmin,p of CW. Further, by a parameter (mp) of a predetermined waiting time, CWmax,p, CWmin,p and TMCOT,p, a channel access priority class is set. For example, the priority class is set as described below.
(Priority Class 1)
mp=1, CWmin,p=3, CWmax,p=7, TMCOT,p=2 ms, allowable CWp size=3, 7
(Priority Class 2)
mp=1, CWmin,p=7, CWmax,p=15, TMCOT,p=3 ms, allowable CWp size=7, 15
(Priority Class 3)
mp=3, CWmin,p=15, CWmax,p=63, TMCOT,p=8 ms or 10 ms, allowable CWp size=15, 31, 63
(Priority Class 4)
mp=7, CWmin,p=15, CWmax,p=1023, TMCOT,p=8 ms or 10 ms, allowable CWp size=15, 31, 63, 127, 255, 511, 1023

FIG. 2 shows an application example of the random back-off. When a transmission point determines that the channel is in an idle state by CCA, the transmission point generates a counter value for random back-off. Then, the transmission points holds the counter value until the transmission point is capable of ascertaining that the channel is available for a waiting time of predetermined period (also called defer period (D_eCCA)). In the case where the transmission point is capable of ascertaining that the channel is available for the predetermined period, the transmission point performs sensing in a predetermined time unit (e.g., eCCA slot time unit), decreases the counter value in the case where the channel is available, and is capable of performing transmission when the counter value becomes zero.

In the random back-off, the counter value is determined in a range associated with the CW size. FIG. 2 shows the case where a random value is selected from among 1 to 16 as the back-off time. Thus, by controlling transmission based on the counter value of random back-off in listening, it is possible to disperse transmission occasions among a plurality of transmission points to be fair.

Also in the case of using the LTE system in an unlicensed band, as in Wi-Fi, it is considered that a transmission point (radio base station and/or user terminal) applies listening before performing UL transmission and/or DL transmission and random back-off in listening.

As described above, the UL standard to perform listening before signal transmission in a user terminal is under circumstances where the standard has yet not been discussed in detail. Therefore, it is necessary to study the UL standard for listening. In this case, considered are a case of transmitting a UL grant in DL transmission within DL MCOT, and performing UL data transmission within the DL MCOT, and another case of transmitting a UL grant in DL transmission within DL MCOT, and performing a part or the whole of UL data transmission out of the DL MCOT.

In the case of transmitting a UL grant in DL transmission within DL MCOT, and performing UL data transmission within the DL MCOT, since DL LBT is performed, and based on the result, DL MCOT is set, conditions for UL LBT may be relaxed. For example, UL data transmission may be permitted by performing UL LBT for a short time (e.g., about 25 ms). Further, when necessary, UL LBT may be omitted. In addition, in this case, as described later, conditions for UL LBT may be determined corresponding to conditions applied to DL LBT.

On the other hand, in the case of transmitting a UL grant in DL transmission within DL MCOT set after LBT, and performing a part or the whole of UL data transmission out of the DL MCOT, it is necessary to study how to apply UL LBT. In view of such a respect, the inventors of the present invention conceived that conditions for UL LBT are determined corresponding to conditions applied to DL LBT, in the case of transmitting a UL grant in DL transmission within DL MCOT, and performing a part or the whole of UL data transmission out of the DL MCOT.

Herein, as conditions applied to DL LBT, there are the presence or absence (Category 2, Category 4) of random back-off, category and/or priority class set in each category, UL traffic type, and combinations thereof. By this means, in a communication using a cell where application of listening is defined, it is possible to actualize proper UL communication.

In other words, in one aspect of the Embodiment of the present invention, in a user terminal which receives a DL signal including a UL transmission indication (UL grant), and controls transmission of UL data based on the UL transmission indication, and UL listening (UL LBT) performed before UL transmission, it is intended to actualize proper UL communication, by controlling so as to perform a channel access procedure with random back-off.

In the case of performing DL LBT and UL LBT separately, there is the risk that UL transmission is significantly delayed. Therefore, in this Embodiment, by an appropriate combination of DL LBT and UL LBT, UL communication is properly performed, while gaining fairness of LBT load. In this Embodiment, limitations are not imposed on DL LBT used to transmit a UL grant i.e. classification is performed using a category (Category 2, Category 4) and/or a priority class set in each category (Category 2, Category 4). Conditions for UL LBT are determined, based on conditions for DL LBT. In addition, in conditions for DL LBT and conditions (predetermined conditions) for UL LBT, combinations thereof are beforehand set, and a radio base station notifies a user terminal of the predetermined conditions.

As the above-mentioned predetermined conditions, as described below, there are three broadly divided conditions. These predetermined conditions are determined corresponding to conditions for DL LBT. In addition, in the following description, the description will be given using Categories 2 and 4 as examples as categories of listening, but this Embodiment is not limited thereto.

(1) Condition 1

In Condition 1, DL LBT is Category 4 (with random back-off), the Priority class is 3, 4, and UL LBT is made Category 2 (without random back-off). This Condition 1 is suitable for the case of transmitting large packet data on UL.

(2) Condition 2

In Condition 2, DL LBT is Category 4 (with random back-off), the Priority class is 1, 2, and UL LBT is made Category 4 (with random back-off). UL LBT is classified into the case where the Priority class is 1, 2 and the case where the Priority class is 3, 4, the case where the Priority class is 1, 2 is suitable for the case of transmitting small packet data on UL, and the case where the Priority class is 3, 4 is suitable for the case of transmitting large packet data on UL.

(3) Condition 3

In Condition 3, DL LBT is Category 2 (without random back-off), and UL LBT is made Category 4 (with random back-off). UL LBT is classified into the case where the Priority class is 1, 2 and the case where the Priority class is 3, 4, the case where the Priority class is 1, 2 is suitable for the case of transmitting small packet data on UL, and the case where the Priority class is 3, 4 is suitable for the case of transmitting large packet data on UL.

Herein, each condition will specifically be described. In addition, in the following description, transmission of UL data after UL LBT will be described, but the present invention is not limited thereto. The invention is similarly applicable to another signal (e.g., PRACH (Physical Random Access Channel), uplink reference signal and the like) after UL LBT. Particularly, it is possible to suitably apply to UL signals (PRACH, non-periodical SRS and the like) transmission of which is controlled (triggered) by a DL signal (e.g., PDCCH).

(Aspect 1: Condition 1)

In Condition 1, in the case where the Priority class 3 or Priority class 4 of DL LBT of Category 4 (with random back-off) is applied to DL transmission including a UL grant, when UL transmission is performed out of the DL MCOT, UL LBT of Category 2 (without random back-off) is applied.

FIGS. 3 to 5 are diagrams to explain Aspect 1 (Condition 1) of the present invention.

Figures 3A, 3B:
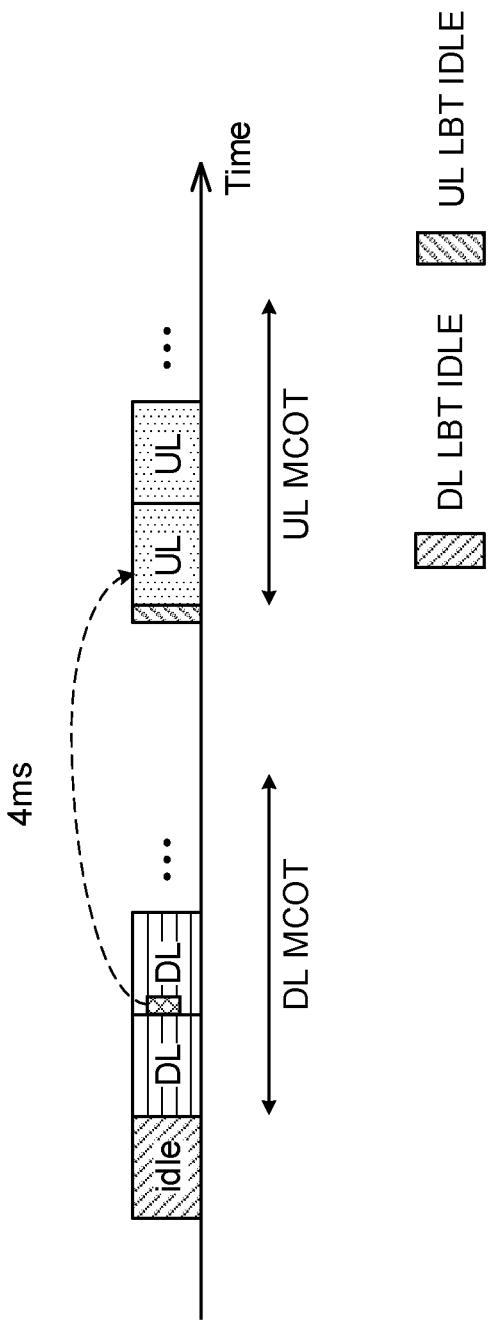
FIGS. 3A and 3B are diagrams to explain Aspect 1 Condition 1) of this Embodiment.

In a procedure of Condition 1, first, as shown in FIG. 3A, a radio base station instructs a user terminal to use UL LBT of Category 2 by a UL grant. The user terminal sets UL MCOT in UL LBT of Category 2. Herein, with respect to the UL MCOT, as shown in FIG. 3B, a plurality of times may be set corresponding to UL traffic types (traffic priority classes). For example, for traffic of high priority, it is possible to set so that a plurality of subframes is used in UL MCOT at a time. Further, the UL MOCT may be used in determination whether the radio base station schedules a plurality of subframes, and when the user terminal undergoes scheduling of a plurality of subframes, may be used in determination of what subframes are used actually.

In Condition 1, it is not possible to select UL MCOT with a value smaller than UL MCOT that corresponds to Traffic Priority class of highest priority (in FIG. 3B, the Traffic Priority class number is low) among UL traffic. For example, in UL buffer, when UL traffic of Traffic Priority class 3 or 4 exists, it is not possible to select longer UL MCOT of Traffic Priority number of 1 or 2. In other words, in Condition 1, as shown in FIG. 4A, in UL buffer, when UL traffic of Traffic Priority class 3 or 4 exists, it is possible to select UL MCOT of Traffic Priority class 3 or 4 (fairness), but it is not possible to select UL MOCT of Traffic Priority class 1 or 2 (unfairness).

In the procedure of Condition 1, first, as shown in FIG. 3A, the radio base station instructs the user terminal to use UL LBT of Category 2 by a UL grant. The user terminal sets UL MCOT in UL LBT of Category 2. Herein, with respect to the UL MCOT, as shown in FIG. 3B, a plurality of times may be set corresponding to UL traffic types (traffic priority classes). For example, for traffic of high priority, it is possible to set so that a plurality of subframes is used in UL MCOT at a time. Further, the UL MOCT may be used in determination whether the radio base station schedules a plurality of subframes, and when the user terminal undergoes scheduling of a plurality of subframes, may be used in determination of what subframes are used actually.

In the case of scheduling a plurality of subframes, both within DL MOCT and out of DL MCOT, UL LBT of Category 2 may be used. In this case, it is possible to perform UL transmission only within the range of UL MCOT after timing of starting UL transmission. FIG. 5 shows a specific example in the case of multi-subframe scheduling.

First, as shown in FIG. 5A, the radio base station instructs the user terminal to use UL LBT of Category 2 by a UL grant. The user terminal performs UL LBT of Category 2. In FIG. 5A, the busy state continues three times, and the fourth time is an idle state. At this point, the user terminal sets UL MCOT. Within the UL MCOT, in the case of selecting a particular Traffic Priority class, traffic of Traffic Priority class of a number smaller than a number of the particular Traffic Priority class is first transmitted, and subsequently, only when there are excess resources within the UL MCOT, traffic of Traffic Priority class of a number larger than the number of the particular Traffic Priority class may be transmitted together.

In FIG. 5B, traffic of Traffic Priority class 2 is transmitted, and subsequently, traffic of Traffic Priority class 3 is transmitted. In other words, the case is shown where traffic of Traffic Priority classes 2 and 3 is transmitted in UL MOOT, and buffer corresponding to Traffic Priority class 4 is not transmitted and is held in the user terminal.

In Condition 1, the information for associating UL MCOT with the Traffic Priority class shown in FIG. 3B may be notified from the radio base station to the user terminal by higher layer signaling and downlink control information, or may be beforehand shared between the radio base station and the user terminal. Further, the information may transmitted using LCG (Logical Channel Groups) for transmitting QCI (Qos Class Indicator).

The information (number of the Traffic Priority class) for identifying UL MCOT shown in FIG. 3B may be notified from the radio base station by higher layer signaling and down control information, or may be selected, in the user terminal, from the information for associating UL MCOT with the Traffic Priority class shown in FIG. 3B.

In Aspect 1, in FIG. 3B, the priority of traffic is set to be higher, as the number of the Traffic Priority class is lower, but the invention is not limited thereto, and the priority of traffic may be set to be higher, as the number of the Traffic Priority class is higher.

(Aspect 2: Condition 2)

In Condition 2, in the case where Priority class 1 or Priority class 2 of DL LBT of Category 4 (with random back-off) is applied to DL transmission including a UL grant, when UL transmission is performed out of the DL MCOT, UL LBT of Category 4 (with random back-off) is applied.

FIGS. 6 and 7 are diagrams to explain Aspect 2 (Condition 2) of the present invention.

In a procedure of Condition 2, first, a radio base station instructs a user terminal to use UL LBT of Category 4 by a UL grant. In Condition 2, Priority classes are defined for UL LBT of Category 4. Subsequently, the user terminal sets UL MCOT in UL LBT of Category 4.

For example, the Priority class is as shown in FIG. 6, and is set by a parameter (mp) of a predetermined waiting time, $CW_{max,p}$, $CW_{min,p}$ and $T_{MCOT,p}$. For example, the Priority class is set as described below.

(Priority Class 1)
mp=1, CWmin,p=1, CWmax,p=3, TMCOT,p=1 ms, allowable CWp size=1, 3
(Priority Class 2)
mp=1, CWmin,p=3, CWmax,p=4, TMCOT,p=2 ms, allowable CWp size=3, 4
(Priority Class 3)
mp=3, CWmin,p=4, CWmax,p=6, TMCOT,p=8 ms or 10 ms, allowable CWp size=4, 5, 6
(Priority Class 4)
mp=3, CWmin,p=4, CWmax,p=7, TMCOT,p=8 ms or 10 ms, allowable CWp size=4, 5, 6, 7

In Condition 2, in order to limit a transmission time length to be short in the case of applying a short predetermined waiting time and small CW size for fairness, the length of UL transmission is set not to exceed UL MCOT of an indicated Priority class. Further, in Condition 2, in order to prevent transmission from being performed for a long time intentionally by including traffic of low priority, regardless of application of a short predetermined time and small CW size, the time is set not to be longer than the length minimally required to transmit traffic of the class number equal to or lower than the indicated Priority class.

As described above, the user terminal sets UL MCOT in UL LBT of Category 4. Within the UL MCOT, it is possible to transmit traffic of a higher number than the number of the Priority class indicated by the radio base station, only in the case where excess resources exist after transmitting all traffic of the Priority class of a number equal to or lower than the number of the Priority class indicated by the radio base station.

In Condition 2, the information for associating UL MCOT with the Priority class shown in FIG. 6 may be notified from the radio base station to the user terminal by higher layer signaling and downlink control information, or may be beforehand shared between the radio base station and the user terminal. Further, the information may be transmitted using LCG (Logical Channel Groups) for transmitting QCI (Qos Class Indicator).

Figure 7A:
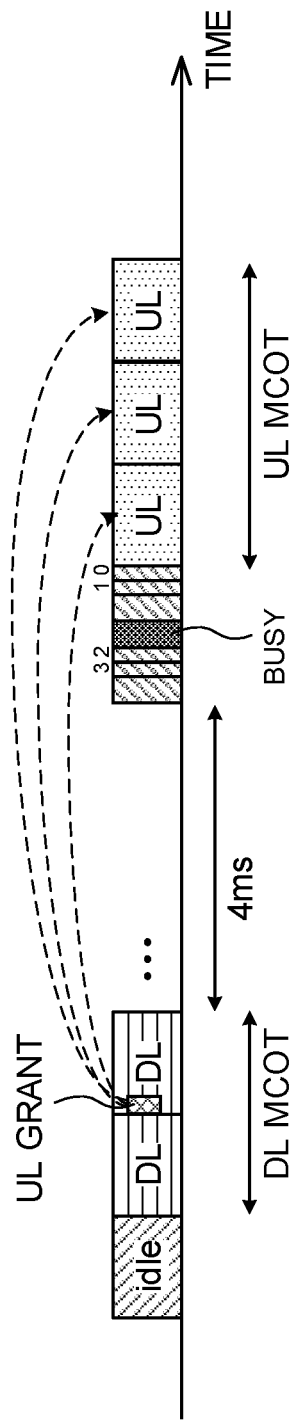
FIGS. 7A and 7B are diagrams to explain Aspect 2 Condition 2) of this Embodiment.

FIG. 7 shows a specific example in the case of Condition 2. First, as shown in FIG. 7A, a radio base station instructs a user terminal to use UL LBT of Category 4 by a UL grant. The user terminal performs UL LBT (herein, a random back-off value is "3") of Category 4 of a Priority class indicated from the radio base station. At this point, the Priority class is notified from the radio base station to the user terminal, or is beforehand shared between the radio base station and the user terminal. The user terminal transmits with a length minimally required to transmit traffic of a number equal to or lower than the number of the Priority class indicated from the radio base station.

Figure 7B:
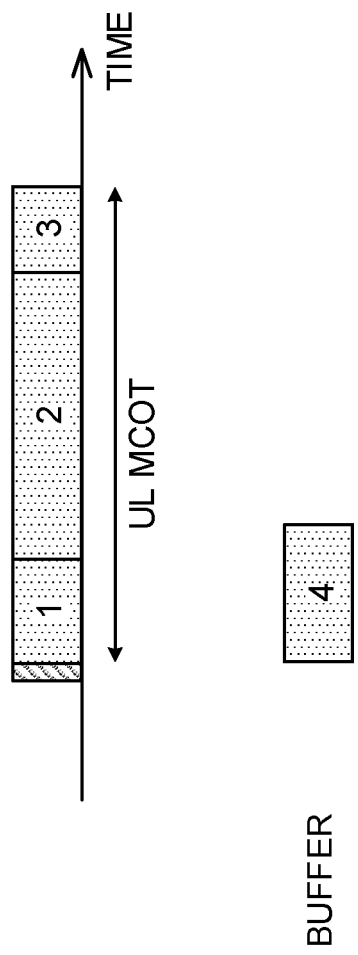

In FIG. 7B, the number of the Priority class indicated from the radio base station is "3", and the user terminal transmits traffic of the Priority class number of 3 or less (1~3). When excess resources exist, it is possible to transmit traffic (in FIG. 7B, traffic of number 4) of a number higher than the number of the Priority class indicated from the radio base station.

In Aspect 3, in FIG. 6, shorter UL MCOT is set, as the number of the Priority class is lower, but the invention is not limited thereto, and shorter UL MCOT may be set, as the number of the Priority class is higher.

(Aspect 3: Condition 3)

In Condition 3, in the case where DL LBT of Category 2 (without random back-off) is applied to DL transmission including a UL grant, when UL transmission is performed out of the DL MCOT, UL LBT of Category 4 (with random back-off) is applied.

FIG. 8 is a diagram to explain Aspect 3 (Condition 3) of the present invention.

In a procedure of Condition 3, first, a radio base station instructs a user terminal to use UL LBT of Category 4 by a UL grant. In Condition 3, in DL transmission within DL MCOT, the station transmits only the UL grant to the user terminal. Also in Condition 3, as in Condition 2, Priority classes are defined for UL LBT of Category 4 (see FIG. 6). Subsequently, the user terminal sets UL MCOT in UL LBT of Category 4.

In Condition 3, in order to limit a transmission time length to be short in the case of applying a short predetermined waiting time and small CW size for fairness, the length of UL transmission is set not to exceed UL MCOT of an indicated Priority class. Further, in Condition 3, in order to prevent transmission from being performed for a long time intentionally by including traffic of low priority, regardless of application of a short predetermined time and small CW size, the time is set not to be longer than the length minimally required to transmit traffic of the class number equal to or lower than the indicated Priority class.

As described above, the user terminal sets UL MCOT in UL LBT of Category 4. Within the UL MCOT, it is possible to transmit traffic of a higher number than the number of the Priority class indicated by the radio base station, only in the case where excess resources exist after transmitting all traffic of the Priority class of a number equal to or lower than the number of the Priority class indicated by the radio base station.

In Condition 3, the information for associating UL MCOT with the Priority class shown in FIG. 6 may be notified from the radio base station to the user terminal by higher layer signaling and downlink control information, or may be beforehand shared between the radio base station and the user terminal. Further, the information may be transmitted using LCG (Logical Channel Groups) for transmitting QCI (Qos Class Indicator).

Figure 8A:
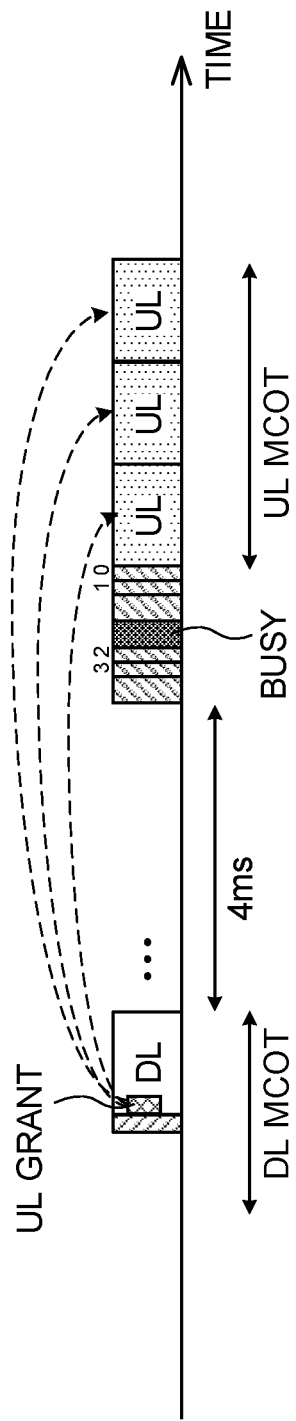
FIGS. 8A and 8B are diagrams to explain Aspect 3 (Condition 3) of this Embodiment.

FIG. 8 shows a specific example in the case of Condition 3. First, as shown in FIG. 8A, a radio base station instructs a user terminal to use UL LBT of Category 4 by a UL grant (in FIG. 8A, only the UL grant is transmitted in DL transmission.) The user terminal performs UL LBT of Category 4 of a Priority class indicated from the radio base station. At this point, the Priority class is notified from the radio base station to the user terminal, or is beforehand shared between the radio base station and the user terminal. The user terminal transmits with a length minimally required to transmit traffic of a number equal to or lower than the number of the Priority class indicated from the radio base station.

Figure 8B:
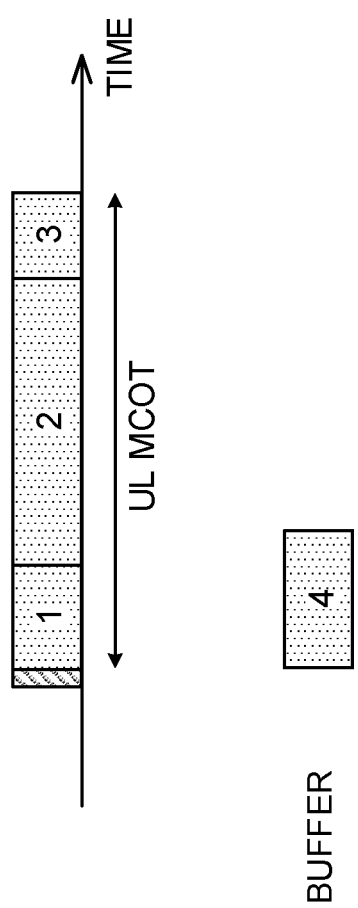

In FIG. 8B, the number of the Priority class indicated from the radio base station is "3", and the user terminal transmits traffic of the Priority class number of 3 or less (1~3). When excess resources exist, it is possible to transmit traffic (in FIG. 8B, traffic of number 4) of a number higher than the number of the Priority class indicated from the radio base station.

In Aspect 3, in FIG. 6, shorter UL MCOT is set, as the number of the Priority class is lower, but the invention is not limited thereto, and shorter UL MCOT may be set, as the number of the Priority class is higher.

In the above-mentioned Conditions 1 to 3, as a method of notifying the user terminal of information about UL LBT from the radio base station, the following methods are considered. For example, the information about UL LBT includes the LBT type (Category 2 or Category 4), CW size or random back-off value in Category 4, Priority class and/or MCOT, the presence or absence of UL LBT gap for CCA, length (e.g., the number of symbols) of UL LBT gap for CCA, ED (Energy detection) threshold (e.g., the presence or absence of coexisting WiFi) and the like.

The radio base station notifies the user terminal of these pieces of information by a UL grant or common PDCCH. For example, these pieces of information are notified by the number of bits as shown in FIG. 9. Among the information in FIG. 9, FIG. 10A shows one example of a bit table for representing the presence or absence of the UL LBT gap, and FIG. 10B shows one example of a bit table for representing the length of the UL LBT gap. Further, FIG. 10C shows one example of a bit table for concurrently representing the presence or absence of the UL LBT gap, and the length of the UL LBT gap.

The information (bit table and the like) shown in FIGS. 9 and 10 is notified from the radio base station to the user terminal by higher layer signaling, or is beforehand held and shared between the radio base station and the user terminal, and the radio base station notifies the user terminal of bit information by a UL grant or common PDCCH.

Further, in the above-mentioned Conditions 1 to 3, since a type of uplink traffic of the user terminal is basically held on the user terminal side, in order for the radio base station to notify the user terminal of a Priority class of UL LBT of Category 4, it is necessary to report what traffic type is held to the radio base station from the user terminal side. In the case where the user terminal reports the traffic type to the radio base station, for example, it is possible to use at least one of higher layer signaling, MAC signaling and physical layer signaling. Alternatively, in the above-mentioned Conditions 1 to 3, based on the type of uplink traffic, the user terminal may determine a Priority class of UL LBT of Category 4. By this means, the need is eliminated for the radio base station to notify the user terminal of a Priority class of UL LBT of Category 4.

(Radio Communication System)

A configuration of a radio communication system according to one Embodiment of the present invention will be described below. In the radio communication system, the radio communication method according to each of the above-mentioned Aspects is applied. In addition, the radio communication method according to each of the above-mentioned Aspects may be applied alone, or may be applied in combination.

Figure 11:
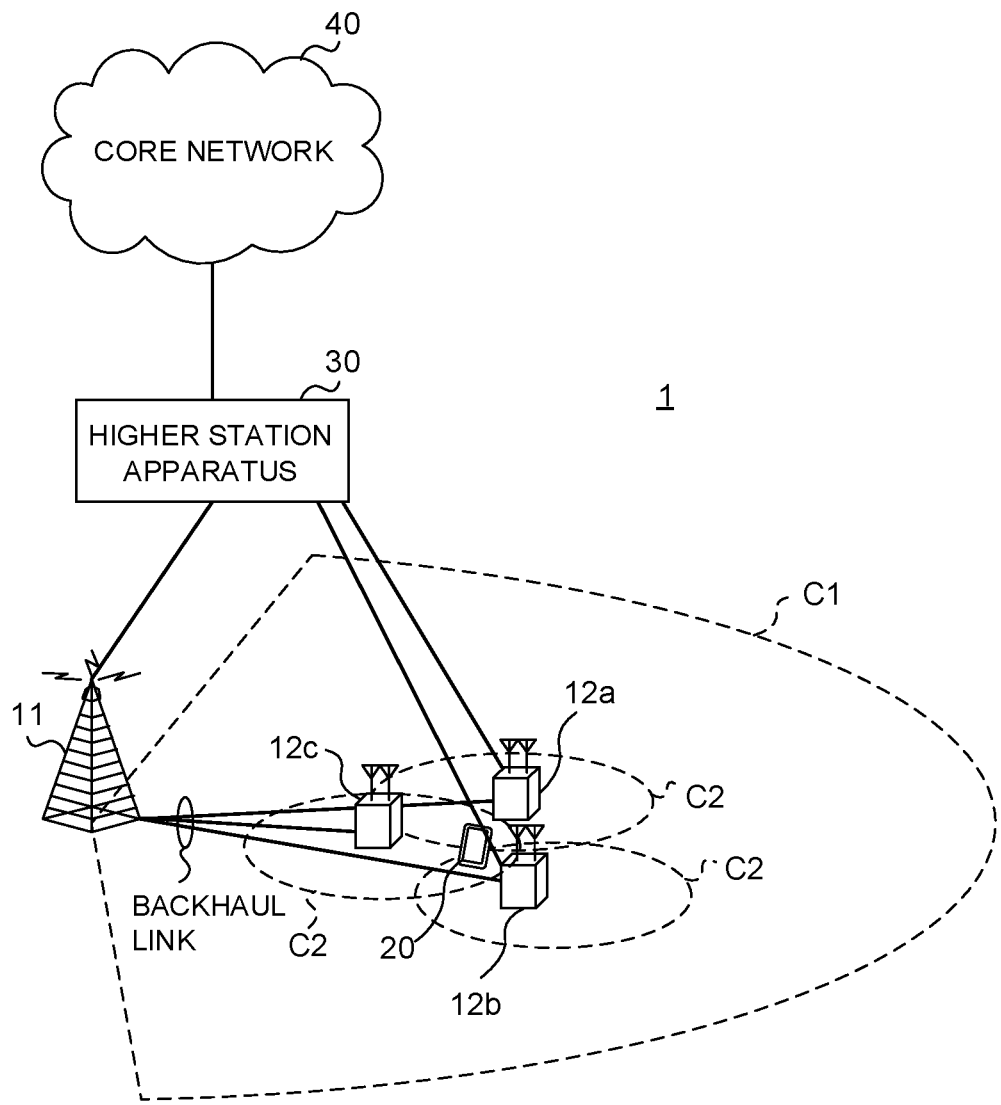
FIG. 11 is a diagram showing one example of a schematic configuration of a radio communication system according to this Embodiment.

FIG. 11 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access) and the like.

The radio communication system 1 as shown in FIG. 11 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. A configuration may be made where different numerology is applied between cells. In addition, the numerology refers to design of a signal in some RAT, and a set of communication parameters featuring design of RAT.

The user terminal 20 is capable of connecting to both the radio base station 11 and the radio base station 12. The user terminal 20 is assumed to concurrently use the macrocell C1 and small cell C2 using different frequencies by CA or DC. Further, the user terminal 20 may apply CA or DC using a plurality of cells (CCs) (e.g., 6 CCs or more). Furthermore, the user terminal is capable of using a licensed band CC and an unlicensed band CC as a plurality of cells.

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz and the like), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface and the like), or wireless connection.

The radio base station 11 and each of the radio base stations 12 are respectively connected to an upper station apparatus 30, and are connected to a core network 40 via the upper station apparatus 30. In addition, for example, the upper station apparatus 30 includes an access gateway apparatus, Radio Network Controller (RNC), Mobility Management Entity (MME) and the like, but is not limited thereto. Further, each of the radio base stations 12 may be connected to the upper station apparatus 30 via the radio base station 11.

In addition, the radio base station 11 is a radio base station having relatively wide coverage, and may be called a macro base station, collection node, eNB (eNodeB), transmission/reception point and the like. Further, the radio base station 12 is a radio base station having local coverage, and may be called a small base station, micro-base station, pico-base station, femto-base station, HeNB (Home eNodeB), RRH (Remote Radio Head), transmission/reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal.

In the radio communication system 1, as radio access schemes, OFDMA (Orthogonal Frequency Division Multiple Access) is applied on downlink, and SC-FDMA (Single Carrier-Frequency Division Multiple Access) is applied on uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes, and OFDMA may be used on uplink.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes downlink control channels (PDCCH (Physical Downlink Control Channel), EPDCCH (Enhanced Physical Downlink Control channel)), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (ACK/NACK) of HARQ for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data and higher layer control information is transmitted on the PUSCH. Uplink control information (UCI) including at least one of receipt confirmation information (ACK/NACK), radio quality information (CQI) and the like is transmitted on the PUSCH or PUCCH. A random access preamble to establish connection with the cell is transmitted on the PRACH.

<Radio Base Station>

In this Embodiment, the radio base station transmits a DL signal including a UL transmission indication, while transmitting a predetermined condition of UL listening for UL data transmission subsequent to DL listening be fore transmission of the DL signal.

Figure 12:
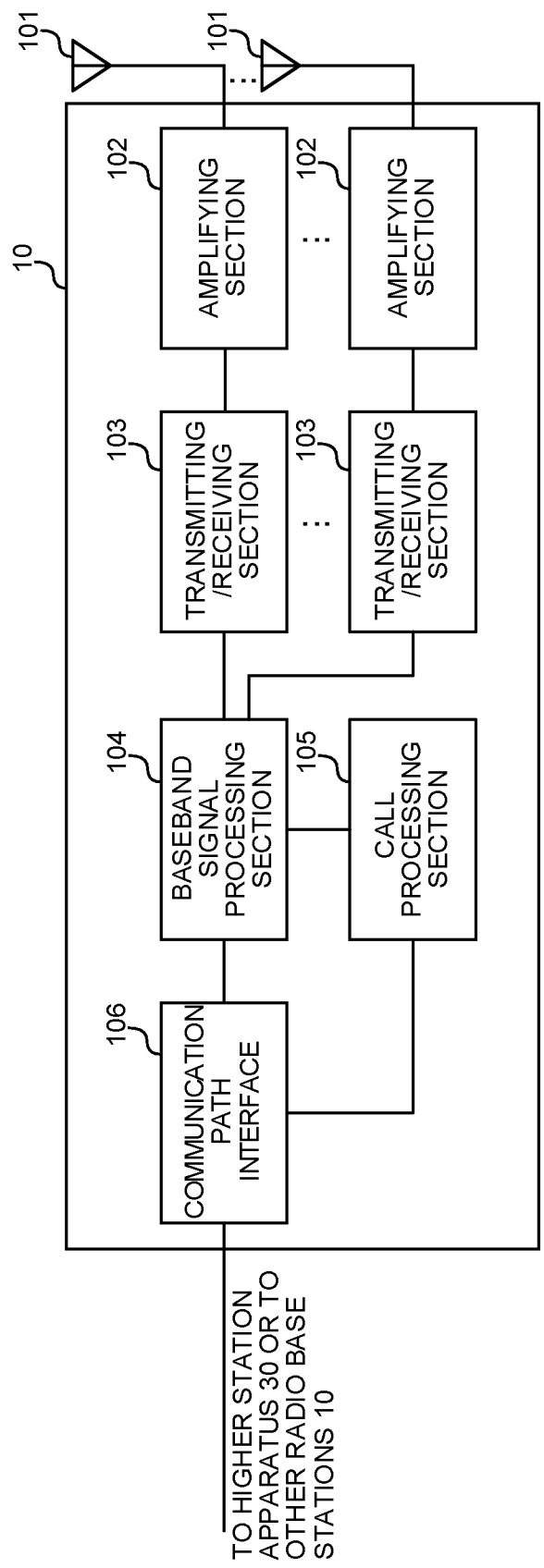
FIG. 12 is a diagram showing one example of an entire configuration of a radio base station according to this Embodiment.

FIG. 12 is a diagram showing one example of an entire configuration of the radio base station according to one Embodiment of the present invention. The radio base station 12 is provided with a plurality of transmission/reception antennas 101, amplifying sections 102, transmission/reception sections 103, baseband signal processing section 104, call processing section 105, and transmission path interface 106. In addition, the transmission/reception section 103 is comprised of a transmission section and a reception section.

User data to transmit to the user terminal 20 from the radio base station 10 on downlink is input to the baseband signal processing section 104 from the upper station apparatus 30 via the transmission path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ (Hybrid Automatic Repeat reQuest)), scheduling, transmission format selection, channel coding, Inverse Fast FourierTransform (IFFT) processing, and precoding processing to transfer to the transmission/reception sections 103. Further, also concerning a downlink control signal, the section 104 performs transmission processing such as channel coding and Inverse Fast Fourier Transform on the signal to transfer to the transmission/reception sections 103.

Each of the transmission/reception sections 103 converts the baseband signal, which is subjected to precoding for each antenna and is output from the baseband signal processing section 104, into a signal with a radio frequency band to transmit. The radio-frequency signal subjected to frequency conversion in the transmission/reception section 103 is amplified in the amplifying section 102, and is transmitted from the transmission/reception antenna 101.

The transmission/reception section (reception section) 103 receives uplink control information and uplink data transmitted from the user terminal. For example, the transmission/reception section (reception section) 103 receives the uplink control information (UCI) on an uplink channel except the uplink shared channel (e.g., LAA, SCell) transmission of which is controlled based on a listening result. As the uplink channel, it is possible to use an uplink control channel and/or uplink shared channel of another cell (e.g., licensed band CC). The transmission/reception section (transmission section) 103 transmits a DL signal (e.g., UL grant and the like) to the user terminal. Further, the transmission/reception section (transmission section) 103 transmits a predetermined condition of UL listening for UL data transmission subsequent to DL listening be fore transmission of the DL signal.

The transmission/reception section 103 is capable of being comprised of a transmitter/receiver, transmission/reception circuit or transmission/reception apparatus explained based on common recognition in the technical field according to the present invention. In addition, the transmission/reception section 103 may be comprised as an integrated transmission/reception section, or may be comprised of a transmission section and reception section.

On the other hand, for uplink signals, radio-frequency signals received in the transmission/reception antennas 101 are amplified in the amplifying sections 102. The transmission/reception section 103 receives the uplink signal amplified in the amplifying section 102. The transmission/reception section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT: Inverse Discrete Fourier Transform) processing, error correcting decoding, reception processing of MAC retransmission control, and reception processing of RLC layer and PDCP layer to transfer to the upper station apparatus 30 via the transmission path interface 106. The call processing section 105 performs call processing such as setting and release of a communication channel, state management of the radio base station 10, and management of radio resources.

The transmission path interface 106 transmits and receives signals to/from the upper station apparatus 30 via a predetermined interface. Further, the transmission path interface 106 may transmit and receive signals (backhaul signaling) to/from an adjacent radio base station 10 via an inter-base station interface (e.g., optical fiber in conformity with CPRI (Common Public Radio Interface), X2 interface).

Figure 13:
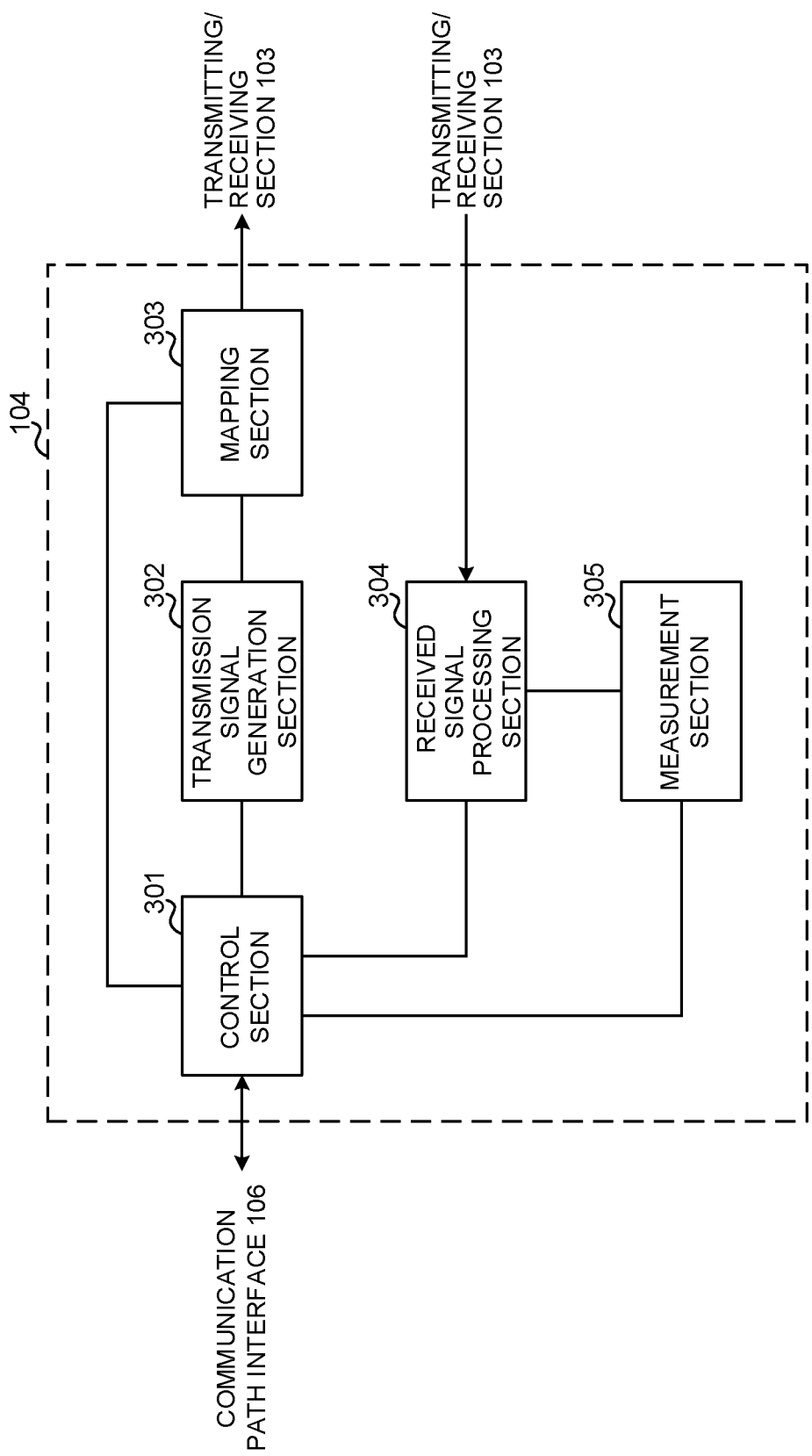
FIG. 13 is a diagram showing one example of a function configuration of the radio base station according to this Embodiment.

FIG. 13 is a diagram showing one example of a function configuration of the radio base station according to this Embodiment. In addition, FIG. 13 mainly illustrates function blocks of a characteristic portion in this Embodiment, and the radio base station 10 is assumed to have other function blocks required for radio communication. As shown in FIG. 13, the baseband signal processing section 104 is provided with a control section (scheduler) 301, transmission signal generating section (generating section) 302, mapping section 303, received signal processing section 304, and measurement section 305.

The control section 301 is capable of controlling transmission/reception of the transmission/reception section (transmission section) 103. For example, the control section 301 controls reception of the uplink control information and uplink data. Further, the control section 301 controls DL LBT (listening) by the measurement section 305, and according to the DL LBT result, controls transmission of downlink signals of the transmission signal generating section 302 and mapping section 303. The control section 301 is capable of being a controller, control circuit or control apparatus explained based on the common recognition in the technical field according to the present invention.

In the case of controlling DL LBT, the control section 301 controls DL LBT of Category 2 and DL LBT of Category 4. Based on the predetermined conditions (Conditions 1 to 3) for DL LBT, the control section 301 controls DL LBT. In other words, in the case where the predetermined conditions are Conditions 1 and 2, the control section 301 controls so as to perform DL LBT (with random back-off) of Category 4, and in the case where the predetermined condition is Condition 3, controls so as to perform. DL LBT of Category 2. Further, in the case of controlling DL LBT of Category 4, the control section 301 distinguishes between Priority class 1, 2 and Priority class 3, 4 to control. The control section 301 controls so as to notify the user terminal of the predetermined condition (Conditions 1 to 3) for UL LBT.

Based on indications from the control section 301, the transmission signal generating section 302 generates DL signals (including downlink data signal and downlink control signal) to output to the mapping section 303. Specifically, the transmission signal generating section 302 generates a downlink data signal (PDSCH) including user data to output to the mapping section 303. Further, the transmission signal generating section 302 generates a downlink control signal (PDCCH/EPDCCH) including DCI (UL grant) to output to the mapping section 303. Furthermore, the transmission signal generating section 302 generates downlink reference signals such as CRS and CSI-RS to output to the mapping section 303.

Based on indications from the control section 301, the mapping section 303 maps the DL signal generated in the transmission signal generating section 302 to predetermined radio resources to output to the transmission/reception section 103. The mapping section 303 is capable of being a mapper, mapping circuit or mapping apparatus explained based on the common recognition in the technical field according to the present invention.

The received signal processing section 304 performs reception processing (e.g., demapping, demodulation, decoding and the like) on the UL signal (HARQ-ACK, PUSCH and the like) transmitted from the user terminal 20. The processing result is output the control section 301. Further, the received signal processing section 304 outputs the received signal and signal subjected to the reception processing to the measurement section 305. The received signal processing section 304 is capable of being comprised of a signal processor, signal processing circuit or signal processing apparatus and a measurement device, measurement circuit or measurement apparatus explained based on the common recognition in the technical field according to the present invention.

The measurement section 305 performs measurement on the received signal. The measurement section 305 is capable of being comprised of a measurement device, measurement circuit or measurement apparatus explained based on the common recognition in the technical field according to the present invention.

Based on indications from the control section 301, the measurement section 305 performs DL LBT using a carrier (e.g., unlicensed band) on which LBT is set, and outputs the DL LBT result (e.g., result of determination whether the channel state is idle or busy) to the control section 301. In addition, the measurement section 305 performs channel detection of predetermined time (defer duration) in DL LBT of Category 2, and performs channel detection of predetermined time (defer duration) and additional period (randomly set additional slot period) in DL LBT of Category 4.

Further, for example, the measurement section 305 may measure received power (e.g., RSRP (Reference Signal Received Power)), received quality (e.g., RSRQ (Reference Signal Received Quality)), channel state and the like of the received signal. The measurement result may be output to the control section 301.

<User Terminal>

In this Embodiment, the user terminal has a reception section that receives a DL signal including a UL transmission indication, and a control section that controls transmission of UL data based on the UL transmission indication, and UL listening performed before UL transmission, and in the control section, in the case of performing UL data transmission after DL listening before transmission of the DL signal, UL listening is performed on the predetermined condition notified from the radio base station.

Figure 14:
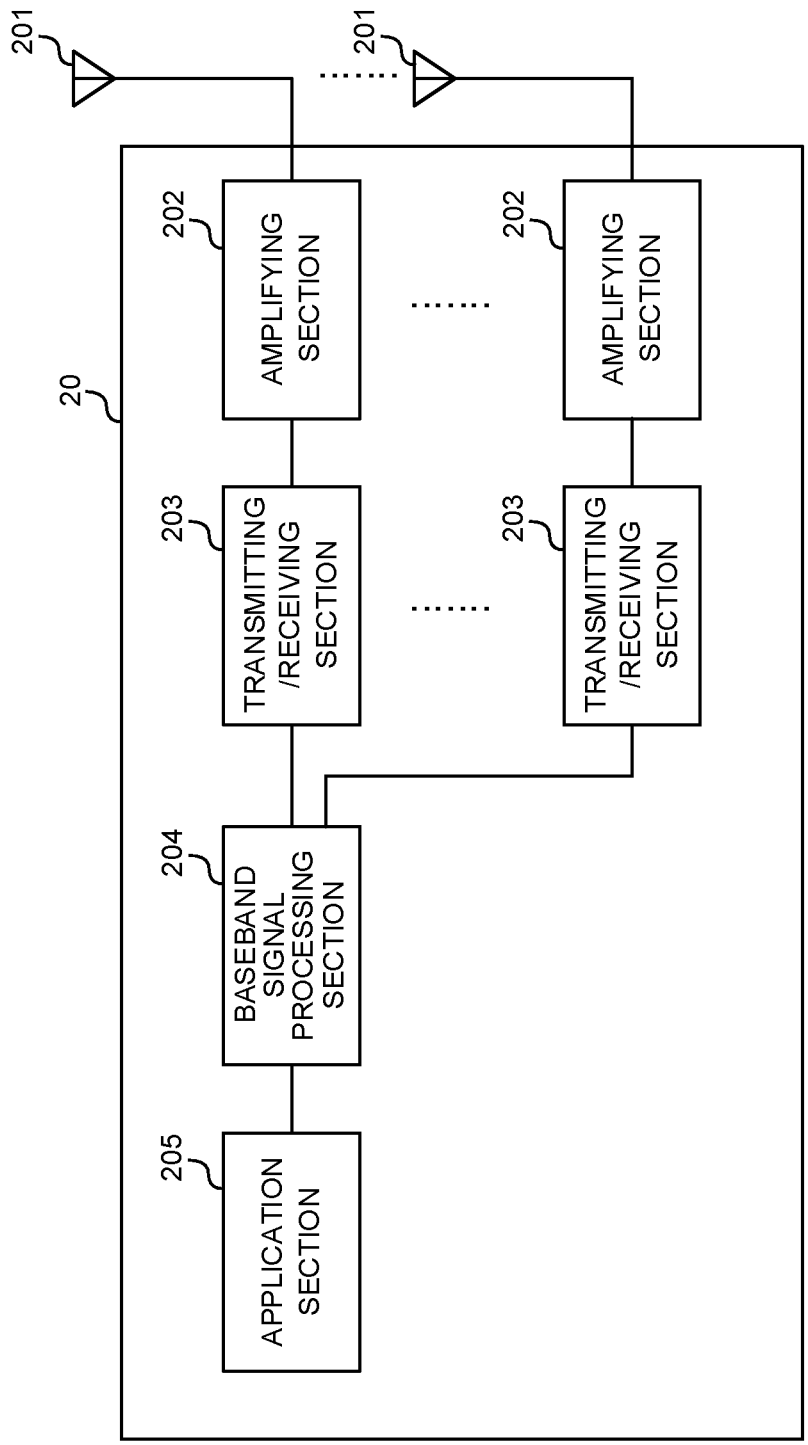
FIG. 14 is a diagram showing one example of an entire configuration of a user terminal according to this Embodiment.

FIG. 14 is a diagram showing one example of an entire configuration of the user terminal according to one Embodiment of the present invention. The user terminal 20 is provided with a plurality of transmission/reception antennas 201 for MIMO transmission, amplifying sections 202, transmission/reception sections 203, baseband signal processing section 204, and application section 205. In addition, the transmission/reception section 203 may be comprised of a transmission section and reception section.

Radio-frequency signals received in a plurality of transmission/reception antennas 201 are respectively amplified in the amplifying sections 202. Each of the transmission/reception sections 203 receives the downlink signal amplified in the amplifying section 202. The transmission/reception section 203 performs frequency conversion on the received signal into a baseband signal to output to the baseband signal processing section 204.

The transmission/reception section (reception section) 203 receives a DL signal (e.g., downlink control information, downlink data) transmitted from the radio base station. Further, the transmission/reception section (reception section) 203 transmits uplink control information and uplink data in response to the received DL signal. The transmission/reception section 203 is capable of being a transmitter/receiver, transmission/reception circuit or transmission/reception apparatus explained based on the common recognition in the technical field according to the present invention.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information is also transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmission/reception sections 203. Each of the transmission/reception sections 203 converts the baseband signal output from the baseband signal processing section 204 into a signal with a radio frequency band to transmit. The radio-frequency signals subjected to frequency conversion in the transmission/reception sections 203 are amplified in the amplifying sections 202, and are transmitted from the transmission/reception antennas 201, respectively.

Figure 15:
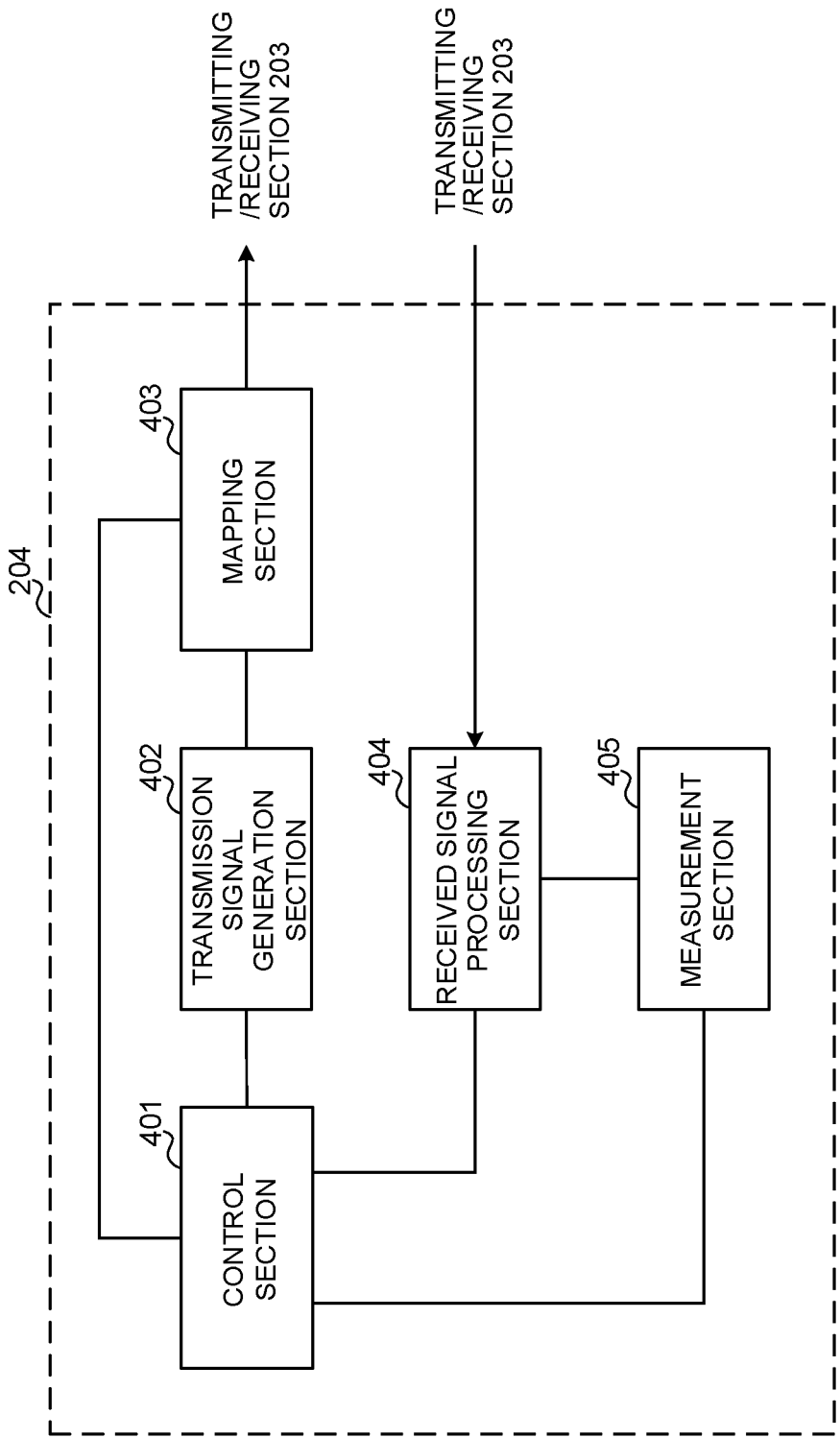
FIG. 15 is a diagram showing one example of a function configuration of the user terminal according to this Embodiment.

FIG. 15 is a diagram showing one example of a function configuration of the user terminal according to this Embodiment. In addition, FIG. 15 mainly illustrates function blocks of a characteristic portion in this Embodiment, and the user terminal 20 is assumed to have other function blocks required for radio communication. As shown in FIG. 15, the baseband signal processing section 204 that the user terminal 20 has is provided with a control section 401, transmission signal generating section 402, mapping section 403, received signal processing section 404, and measurement section 405.

The control section 401 acquires the downlink control signal (signal transmitted on the PDCCH/EPDCCH) and downlink data signal (signal transmitted on the PDSCH) transmitted from the radio base station 10, from the received signal processing section 404. Based on the downlink control signal, a result obtained by judging necessity of retransmission control with respect to the downlink data signal and the like, the control section 401 controls generation of the uplink control signal and uplink data signal. Specifically, the control section 401 is capable of performing control of the transmission signal generating section 402, mapping section 403, received signal processing section 404, and measurement section 405.

The control section 401 is capable of controlling transmission/reception of the transmission/reception section (transmission section) 103. For example, the control section 401 controls transmission of the uplink control information and uplink data. Further, the control section 401 controls UL LBT (listening) by the measurement section 405, and according to the UL LBT result, controls transmission of the uplink signal of the transmission signal generating section 402 and mapping section 403. The control section 401 is capable of being a controller, control circuit or control apparatus explained based on the common recognition in the technical field according to the present invention.

Based on the predetermined condition (Conditions 1 to 3) for UL LBT notified from the radio base station, the control section 401 controls UL LBT. In other words, in the case where the predetermined condition is Condition 1, the control section 401 controls so as to perform UL LBT of Category 2, and in the case where the predetermined conditions are Conditions 2 and 3, controls so as to perform UL LBT (with random back-off) of Category 4. Further, in the case of controlling UL LBT of Category 4, the control section 401 distinguishes between Priority class 1, 2 and Priority class 3, 4 to control. Furthermore, the control section 401 controls UL channel occupancy time (UL MCOT) set after the UL LBT based on the traffic type (priority) of the uplink data signal, Based on indications from the control section 401, the transmission signal generating section 402 generates UL signals to output to the mapping section 403. For example, based on indications from the control section 401, the transmission signal generating section 402 generates the uplink data signal.

Further, based on indications from the control section 401, the transmission signal generating section 402 generates the uplink data signal. For example, when the downlink control signal notified from the radio base station 10 includes a UL grant, the transmission signal generating section 402 is instructed to generate the uplink data signal from the control section 401. The transmission signal generating section 402 is capable of being a signal generator, signal generating circuit or signal generating apparatus explained based on the common recognition in the technical field according to the present invention.

Based on indications from the control section 401, the mapping section 403 maps the uplink signal (uplink control signal and/or uplink data) generated in the transmission signal generating section 402 to radio resources to output to the transmission/reception section 203. The mapping section 403 is capable of being a mapper, mapping circuit or mapping apparatus explained based on the common recognition in the technical field according to the present invention.

The received signal processing section 404 performs reception processing (e.g., demapping, demodulation, decoding and the like) on the DL signal (e.g., downlink control signal transmitted from the radio base station, downlink data signal transmitted on the PDSCH and the like). The received signal processing section 404 outputs the information received from the radio base station 10 to the control section 401 and the measurement section 405. For example, the received signal processing section 404 outputs the broadcast signal, system information, RRC signaling, DCI and the like to the control section 401.

The received signal processing section 404 is capable of being comprised of a signal processor, signal processing circuit or signal processing apparatus and a measurement device, measurement circuit or measurement apparatus explained based on the common recognition in the technical field according to the present invention. Further, the received signal processing section 404 constitutes the reception section according to the present invention.

The measurement section 405 performs measurement on the received signal. The measurement section 405 is capable of being comprised of a measurement device, measurement circuit or measurement apparatus explained based on the common recognition in the technical field according to the present invention.

Based on indications from the control section 401, the measurement section 405 performs UL LBT using a carrier (e.g., unlicensed band) on which LBT is set, and outputs the UL LBT result (e.g., result of determination whether the channel state is idle or busy) to the control section 401. In addition, the measurement section 405 performs channel detection of predetermined time (defer duration) in UL LBT of Category 2, and performs channel detection of predetermined time (defer duration) and additional period (randomly set additional slot period) in UL LBT of Category 4.

Further, for example, the measurement section 405 may measure received power (e.g., RSRP (Reference Signal Received Power)), received quality (e.g., RSRQ (Received Signal Received Quality)), channel state and the like of the received signal. The measurement result may be output to the control section 401.

In the radio communication system with the configuration as described above, the radio base station transmits a DL signal including a UL transmission indication, and the user terminal receives the DL signal. The user terminal controls transmission of UL data based on the UL transmission indication, and UL LBT performed before UL transmission. In this control, in the case of performing transmission of UL data after DL LBT before transmission of the DL signal, UL LBT is performed on the predetermined condition (Conditions 1 to 3) notified from the radio base station.

By such a method, it is possible to actualize proper UL communication in the communication system using a cell where application of LBT is defined.

(Hardware Configuration)

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically, or two or more apparatuses that are separated physically may be connected by cable or radio, and each function block may be actualized by a plurality of these apparatuses.

Figure 16:
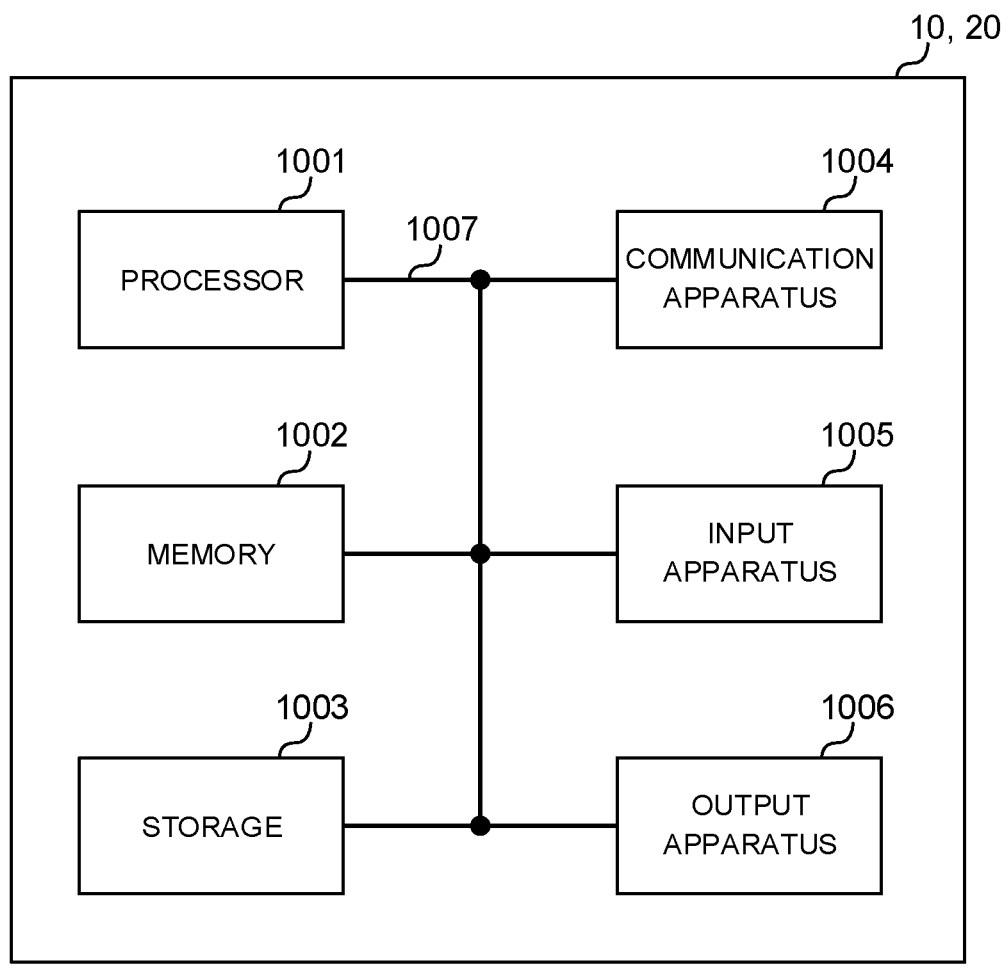
FIG. 16 is a diagram showing one example of hardware configurations of the radio base station and user terminal according to one Embodiment of the present invention.

For example, each of the radio base station, user terminal and the like in one Embodiment of the present invention may function as a computer that performs the processing of the radio communication method of the invention. FIG. 16 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include a single or a plurality, or may be configured without including a part of apparatuses.

Each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing apparatus 105 and the like may be actualized by the processor 1001.

Further, the processor 1001 reads the program (program code), software module and data on the memory 1002 from the storage 1003 and/or the communication apparatus 1004, and according thereto, executes various kinds of processing. Used as the program is a program that causes the computer to execute at least apart of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), RAM (Random Access Memory) and the like. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of an optical disc such as CD-ROM (Compact Disc ROM), hard disk drive, flexible disk, magneto-optical disk, flash memory and the like. The storage 1003 may be called an auxiliary storage apparatus.

The communication apparatus 1004 is hardware (transmission/reception device) to perform communication between computers via a wired and/or wireless network, and for example, is also referred to as a network device, network controller, network card, communication module and the like. For example, the transmission/reception antenna 101 (201), amplifying section 102 (202), transmission/reception section 103 (203), transmission path interface 106 and the like as described above may be actualized by the communication apparatus 1004.

The input apparatus 1005 is an input device (e.g., keyboard, mouse and the like) that receives input from the outside. The output apparatus 1006 is an output device (e.g., display, speaker and the like) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or apart or the whole of each function block may be actualized by the hardware. For example, the processor 1001 may be implemented by at least one of the hardware.

In addition, the term explained in the present Description and/or the term required to understand the present Description may be replaced with a term having the same or similar meaning. For example, the channel and/or the symbol may be a signal (signaling). Further, the signal may be a message. Furthermore, the component carrier (CC) may be called a cell, frequency carrier, carrier frequency and the like.

Further, the radio frame may be comprised of a single or a plurality of frames in the time domain. The single or each of the plurality of frames constituting the radio frame may be called a subframe. Furthermore, the subframe may be comprised of a single or a plurality of slots in the time domain. Still furthermore, the slot may be comprised of a single or a plurality of symbols (OFDM symbol, SC-FDMA symbol and the like) in the time domain.

Each of the radio frame, subframe, slot and symbol represents a time unit in transmitting a signal. For the radio frame, subframe, slot and symbol, another name corresponding to each of them may be used. For example, one subframe may be called Transmission Time Interval (TTI), a plurality of contiguous subframes may be called TTI, or one slot may be called TTI. In other words, the subframe and TTI may be the subframe (1 ms) in the existing LTE, may be a frame (e.g., 1 to 13 symbols) shorter than 1 ms, or may be a frame longer than 1 ms.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The resource block (RB) is are source allocation unit in the time domain and frequency domain, and may include a single or a plurality of contiguous subcarriers in the frequency domain. Further, the RB may include a single or a plurality of symbols in the time domain, and may have a length of 1 slot, 1 subcarrier, or 1 TTI. Each of 1 TTI and 1 subframe may be comprised of a single or a plurality of resource blocks. In addition, the RB may be called a physical resource block (PRB: Physical RB), PRB pair, RB pair and the like.

Further, the resource block may be comprised of a single or a plurality of resource elements (RE: Resource Element). For example, 1 RE may be a radio resource region of 1 subcarrier and 1 symbol.

In addition, structures of the above-mentioned radio frame, subframe, slot, symbol and the like are only illustrative. For example, it is possible to modify, in various manners, configurations of the number of subframes included in the radio frame, the number of slots included in the subframe, the numbers of symbols and RBs included in the slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

Furthermore, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

Each Aspect/Embodiment explained in the present Description may be used alone, may be used in combination, or may be switched and used according to execution. Further, notification of predetermined information (e.g., notification of "being X") is not limited to notification that is performed explicitly, and may be performed implicitly (e.g., notification of the predetermined information is not performed.)

Notification of the information is not limited to the Aspects/Embodiment described in the present Description, and may be performed by another method. For example, notification of the information may be performed using physical layer signaling (e.g., DCI (Downlink Control Information), UCI (Uplink Control Information)), higher layer signaling (e.g., RRC (Radio Resource Control) signaling, broadcast information (MIB (Master Information Block), SIB (System Information Block) and the like), MAC (Medium Access Control) signaling), other signals, or combination thereof. Further, RRC signaling may be called RRC message, and for example, may be RRC Connection Setup message, RRC Connection Reconfiguration message, and the like. Furthermore, for example, MAC signaling may be notified by MAC Control Element (MAC CE).

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

With respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

As described above, the present invention is described in detail, but it is obvious to a person skilled in the art that the invention is not limited to the Embodiment described in the present Description. For example, each Embodiment as described above may be used alone, or may be used in combination. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2016-073409 filed on Mar. 31, 2016, entire content of which is expressly incorporated by reference herein.

The invention claimed is:

1. A terminal comprising:
a receiver that receives higher layer signaling including information for configuring a channel occupancy time (COT) and, on a common Physical Downlink Control Channel (PDCCH), receives downlink control information (DCI) including information regarding the COT; and
a processor that controls transmission of a physical uplink shared channel (PUSCH) based on the information regarding the COT and based on a channel access procedure before the UL transmission,
wherein the processor, when the UL transmission is performed outside the COT of downlink, is configured to control so as to perform a channel access procedure with random back-off,
wherein uplink control information (UCI) is transmitted on the PUSCH,
wherein a priority class is indicated from a base station,
wherein, when excess resources exist, the processor controls so as to perform the channel access procedure with random back-off with a priority class whose value is larger than the priority class value indicated from the base station,
wherein a back-off time of the random back-off is determined based on at least one of a plurality of contention window sizes, and the plurality of the contention window sizes are associated with the priority class indicated from the base station,
wherein a number of the plurality of the contention window sizes varies per a value of the priority class,
wherein, for each of priority classes 3 and 4, a number of allowed contention window sizes is more than for any of priority classes 1 and 2,
wherein, for each of priority classes 3 and 4, there are only two allowed maximum channel occupancy times,
wherein, for each of priority classes 1 and 2, there is only one allowed maximum channel occupancy time, and
wherein the allowed maximum channel occupancy time for priority class 2 is twice the allowed maximum channel occupancy time for priority class 1.

2. The terminal according to claim 1, wherein the channel access procedure with random back-off is indicated by DCI scheduling the PUSCH.

3. The terminal according to claim 2, wherein the receiver receives information indicating channel access type, the contention window size, and the priority class indicated from the base station by using higher layer signaling and DCI scheduling the PUSCH.

4. The terminal according to claim 1, wherein priority classes 1 and 2 use a same waiting time parameter.

5. A radio communication method for a terminal, comprising:
receiving higher layer signaling including information for configuring a channel occupancy time (COT);
receiving, on a common Physical Downlink Control Channel (PDCCH), downlink control information (DCI) including information regarding the COT; and
controlling transmission of a physical uplink shared channel (PUSCH) based on the information regarding the COT and based on a channel access procedure before the UL transmission,
wherein, when the UL transmission is performed outside the COT of downlink, the terminal is configured to control so as to perform a channel access procedure with random back-off,
wherein uplink control information (UCI) is transmitted on the PUSCH,
wherein a priority class is indicated from a base station,
wherein, when excess resources exist, the terminal controls so as to perform the channel access procedure with random back-off with a priority class whose value is larger than the priority class value indicated from the base station,
wherein a back-off time of the random back-off is determined based on at least one of a plurality of contention window sizes, and the plurality of the contention window sizes are associated with the priority class indicated from the base station,
wherein a number of the plurality of the contention window sizes varies per a value of the priority class,
wherein, for each of priority classes 3 and 4, a number of allowed contention window sizes is more than for any of priority classes 1 and 2,
wherein, for each of priority classes 3 and 4, there are only two allowed maximum channel occupancy times,
wherein, for each of priority classes 1 and 2, there is only one allowed maximum channel occupancy time, and
wherein the allowed maximum channel occupancy time for priority class 2 is twice the allowed maximum channel occupancy time for priority class 1.

6. A system comprising a base station and terminal:
the base station comprises:
a transmitter that transmits higher layer signaling including information for configuring a channel occupancy time (COT) and, on a common Physical Downlink Control Channel (PDCCH), transmits downlink control information (DCI) including information regarding the COT; and the terminal comprises:
- a receiver that receives the higher layer signaling and the DCI; and
- a processor that controls transmission of a physical uplink shared channel (PUSCH) based on the information regarding the COT and based on a channel access procedure before the UL transmission, wherein the processor, when the UL transmission is performed outside the COT of downlink, is configured to control so as to perform a channel access procedure with random back-off, wherein uplink control information (UCI) is transmitted on the PUSCH, wherein a priority class is indicated from the base station, wherein, when excess resources exist, the processor controls so as to perform the channel access procedure with random back-off with a priority class whose value is larger than the priority class value indicated from the base station, wherein a back-off time of the random back-off is determined based on at least one of a plurality of contention window sizes, and the plurality of the contention window sizes are associated with the priority class indicated from the base station, wherein a number of the plurality of the contention window sizes varies per a value of the priority class, wherein, for each of priority classes 3 and 4, a number of allowed contention window sizes is more than for any of priority classes 1 and 2, wherein, for each of priority classes 3 and 4, there are only two allowed maximum channel occupancy times, wherein, for each of priority classes 1 and 2, there is only one allowed maximum channel occupancy time, and wherein the allowed maximum channel occupancy time for priority class 2 is twice the allowed maximum channel occupancy time for priority class 1.

* * * * *